United States Patent [19]

Kaufman

[11] 4,004,301
[45] Jan. 25, 1977

[54] EYELET ARRANGEMENT FOR POOLS

[76] Inventor: Samuel Kaufman, 860 Pennsylvania Ave., Hagerstown, Md. 21740

[22] Filed: Aug. 4, 1975

[21] Appl. No.: 601,295

[52] U.S. Cl. .......................................... 4/172; 4/1; 85/9 R; 85/42; 403/201
[51] Int. Cl.² ...................... E04H 3/16; E04H 3/18; F16L 22/02
[58] Field of Search ............ 4/172, 172.11, 172.19, 4/172.21, 172.13, 172.14; 85/9 R, 42; 403/343, 201

[56] References Cited

UNITED STATES PATENTS

| | | | |
|---|---|---|---|
| 335,009 | 1/1886 | Barnes | 85/9 R |
| 1,644,442 | 10/1927 | Ostman | 85/9 R |
| 2,136,523 | 11/1938 | Rosenberg | 85/9 R |
| 2,609,638 | 9/1952 | Lindenmeyer | 403/343 X |
| 2,748,646 | 6/1956 | Harold et al. | 85/9 R |
| 3,868,732 | 3/1975 | Engelhart | 4/172 |

*Primary Examiner*—Henry K. Artis
*Attorney, Agent, or Firm*—Watson, Cole, Grindle & Watson

[57] ABSTRACT

A removably mounted swimming pool safety rope anchoring device for a pool with a metal, wood or fiberglass wall and a vinyl liner includes a stem having an enlarged portion at one end, and threaded along its whole exterior; a nut which can be threaded on the smaller end; and an eye part having an internally threaded socket portion which threadedly engages the enlarged portion of the stem and an eye rigid with the socket portion. This is inserted through the wall during the installation of the pool with the nut on the outside and the stem extending through a hole in the pool wall. A lock washer and a sealing washer are arranged between the nut and the pool wall. A hole is cut in the liner to allow the enlarged portion to project through, and the portion of the liner around the enlarged portion is overlaid and clamped by the socket portion. This permits the eye part to be removed and the liner to be changed without requiring access to the nut on the outside of the wall.

2 Claims, 3 Drawing Figures

EYELET ARRANGEMENT FOR POOLS

BACKGROUND OF THE INVENTION

1. Field of the Invention

The invention relates to an eyelet arrangement for use with a swimming pool having a plastic liner which permits the part having the eye to be removed to allow changing of the plastic liner without requiring access to the outside of the wall.

2. The Prior Art

The patent to Engelhart U.S. Pat. No. 3,868,732 shows a device for accomplishing the same function as the present invention. The device of Engelhart however is quite expensive, as it involves the use of an externally and internally threaded sleeve having a large flange at one end, the making of which requires a number of costly operations.

SUMMARY OF THE INVENTION

The present invention provides a much less complicated and less expensive arrangement which accomplishes the same result as that of Engelhart, namely to permit the removal of an eye member and the exchange of a plastic liner in the pool without requiring access to the outside of the pool wall. In many cases, when the pool is completed, the outer nut is inaccessable because of a concrete deck having been installed around the pool.

A further advantage over the Engelhart device is that the present arrangement requires only a ½ inch hole through the wall, whereas Engelhart's device, for substantially the same size unit, requires the cutting of a ¾ inch hole. Thus the present arrangement can be installed with less expensive equipment, and equipment which is more often used on the job.

DESCRIPTION OF THE PREFERRED EMBODIMENTS

Figure 1:
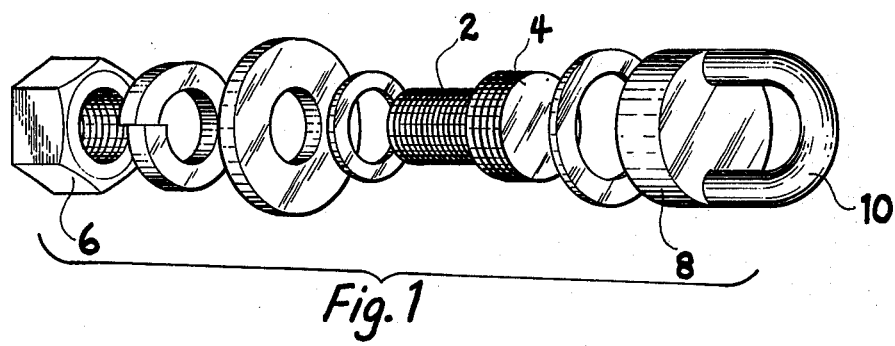
FIG. 1 shows in an exploded view an eyelet arrangement embodying the invention.
Figure 2:
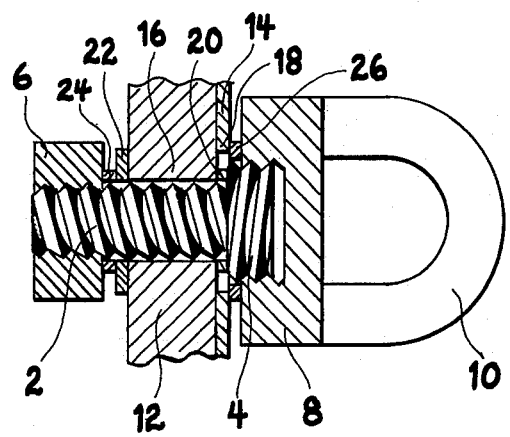
FIG. 2 shows the device assembled in the wall of a pool.

Referring to FIGS. 1 and 2 the device comprises a stem member having a smaller portion 2 and an enlarged portion 4 at one end. The stem and the enlarged portion are both externally threaded. A nut 6 is threadable on the smaller portion 2 of the stem. An eye part 8 having an eye 10 is also provided, the eye part comprising an internally threaded socket which is capable of being threaded on the enlarged portion 4 of the stem and an eyelet portion rigid therewith.

In using this device, for example, in connection with a pool having a metal wall or a wall of any other material 12 and a plastic liner 14, a hole 16 is bored in the wall 12 of a size which is just large enough to receive the narrow portion of the stem. After the liner is installed and the pool is filled with water, a hole 18 is cut in the liner which is large enough to allow the enlarged portion of the stem 4 to project through the liner.

A washer 26, which is larger than the hole 18 in the liner is then applied over the larger portion and the socket part 8 is threaded on the larger portion 4, thus compressing the washer 26 against the liner 14 and holding the liner in place. If the liner needs replacement for any reason, it can be replaced without the rope anchor being an impediment in performing this task, since it can easily be removed to allow the old liner to come out and a new liner to be fitted as originally done.

Figure 3:
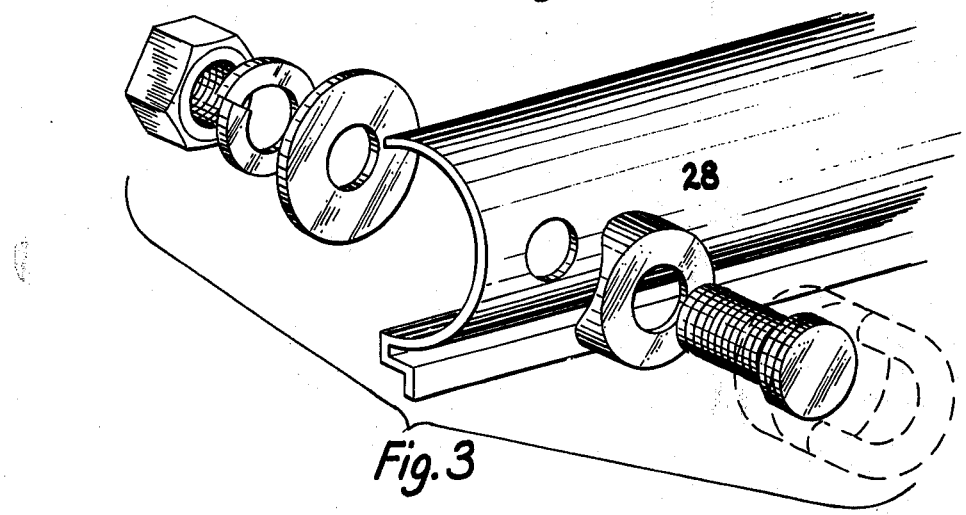
FIG. 3 shows a modification for application to a round nose coping.

With reference to FIG. 3, in some pools there is a round nose coping at the upper edge of the pool to which some pool builders may elect to attach this device. This can be accomplished as shown in FIG. 3 by using a washer 28 with a round recess 30 fitting against the nose of the coping.

I claim:

1. Eyelet arrangement for a swimming pool for holding a rope comprising a stem having an enlarged portion at one end and a smaller portion, the enlarged portion and at least that part of the smaller portion remote from the enlarged portion having threads on the exterior thereof, a nut threadedly engaging such end of the smaller portion, and an eye part comprising an internally threaded socket portion threadedly engaging such enlarged portion and an eye integral with the socket portion, the inwardly directed annular face of the socket portion being larger in cross section than the enlarged portion for engaging a liner between such face and the wall of the pool whereby a liner may be removed by removal of said eye part without access to such nut.

2. Eyelet arrangement for a swimming pool for holding a rope in a pool having a round nose coping, comprising a stem having an enlarged portion at one end and a smaller portion, the enlarged portion and at least that part of the smaller portion remote from the enlarged portion having threads on the exterior thereof, a nut threadedly engaging such end of the smaller portion, and an eye part comprising an internally threaded socket portion threadedly engaging such enlarged portion and an eye rigid integral with the socket portion, the inwardly directed face of the socket portion being larger in cross section than the enlarged portion, and a washer engageable over the smaller portion and positionable between the inwardly directed face of the socket portion and a coping, and having a curvature on the face remote from the eye part substantially equal to the convex curvature of a coping.

* * * * *